United States Patent
Dodeja et al.

(10) Patent No.: US 11,557,110 B2
(45) Date of Patent: Jan. 17, 2023

(54) SELECTIVE EXTRACTION OF COLOR ATTRIBUTES FROM DIGITAL IMAGES

(71) Applicant: Adobe Inc., San Jose, CA (US)

(72) Inventors: Nitesh Dodeja, Delhi (IN); Rakesh Baidya, Delhi (IN); Rajeev Kumar, Nawada (IN); Ankita Saha, New Delhi (IN)

(73) Assignee: Adobe Inc., San Jose, CA (US)

(*) Notice: Subject to any disclaimer, the term of this patent is extended or adjusted under 35 U.S.C. 154(b) by 189 days.

(21) Appl. No.: 17/112,127

(22) Filed: Dec. 4, 2020

(65) Prior Publication Data

US 2022/0180116 A1    Jun. 9, 2022

(51) Int. Cl.
 *G06K 9/62* (2022.01)
 *G06V 10/56* (2022.01)
 *G06V 10/75* (2022.01)

(52) U.S. Cl.
 CPC ........... *G06V 10/56* (2022.01); *G06K 9/6282* (2013.01); *G06V 10/758* (2022.01); *G06T 2207/10024* (2013.01)

(58) Field of Classification Search
 CPC ...... G06V 10/56; G06V 10/758; G06V 10/25; G06K 9/6282; G06T 2207/10024; G06T 11/60; H04N 11/00
 USPC ........................................................ 382/165
 See application file for complete search history.

(56) References Cited

U.S. PATENT DOCUMENTS

| | | | |
|---|---|---|---|
| 2002/0130884 A1* | 9/2002 | Rose ......................... | G09G 5/02 345/594 |
| 2004/0017939 A1* | 1/2004 | Mehrotra ................ | H04N 19/12 375/E7.137 |
| 2008/0240572 A1* | 10/2008 | Hoshii ................. | G06F 16/5838 382/190 |
| 2019/0304008 A1* | 10/2019 | Cen .................... | G06Q 30/0643 |
| 2021/0027497 A1* | 1/2021 | Ding ..................... | G06K 9/6215 |

(Continued)

OTHER PUBLICATIONS

"Adobe Capture", Adobe Website [retrieved Dec. 3, 2020], Retrieved from the Internet <https://www.adobe.com/in/products/capture.html>., Dec. 2020, 6 pages.

(Continued)

*Primary Examiner* — Ali Bayat
(74) *Attorney, Agent, or Firm* — FIG. 1 Patents

(57) ABSTRACT

Techniques are described for selective extraction of color attributes from digital images that overcome the challenges experienced in conventional systems for color extraction. In an implementation, a user applies a region selector to a source image to select a portion of the source image for color attribute extraction. A graphics editing system identifies a selected region of the source image as well as visual objects of the source image included as part of the selected region. The graphics editing system iterates through the selected visual objects and extracts color attributes from the visual objects, such as color values, patterns, gradients, gradient stops, opacity, color area, and so forth. The graphics editing system then generates a color palette that includes the extracted color attributes, and the color palette is able to be utilized for various image editing tasks, such as digital image creation and transformation.

20 Claims, 15 Drawing Sheets

(7 of 15 Drawing Sheet(s) Filed in Color)

(56) References Cited

U.S. PATENT DOCUMENTS

2021/0089040 A1* 3/2021 Ebrahimi Afrouzi .................. A47L 9/2894
2022/0067976 A1* 3/2022 Gershon .............. G06Q 10/087

OTHER PUBLICATIONS

"Color Theme from Image", Adobe Color Website [retrieved Dec. 3, 2020], Retrieved from the Internet <https://color.adobe.com/create/image>., Dec. 2020, 1 page.
"How to Adjust Appearance Attributes in Illustrator", Adobe Support Website [retrieved Dec. 3, 2020], Retrieved from the Internet <https://helpx.adobe.com/in/illustrator/using/appearance-attributes.html>., Sep. 7, 2018, 11 pages.
Chivers, Sam , "Create a unified color theme", Adobe Support Website [retrieved Dec. 3, 2020], Retrieved from the Internet <https://helpx.adobe.com/in/indesign/how-to/color-theme-tool.html>., Jan. 13, 2020, 10 pages.

\* cited by examiner

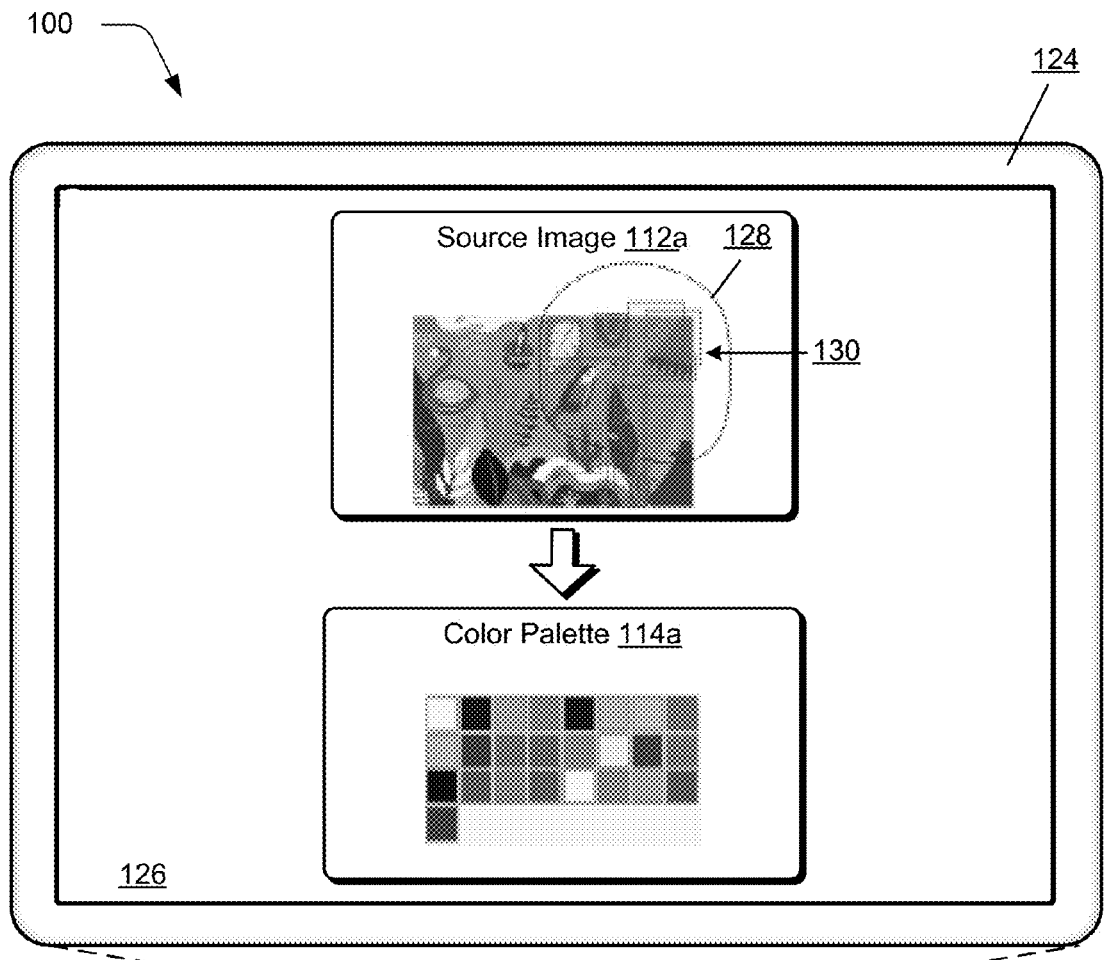
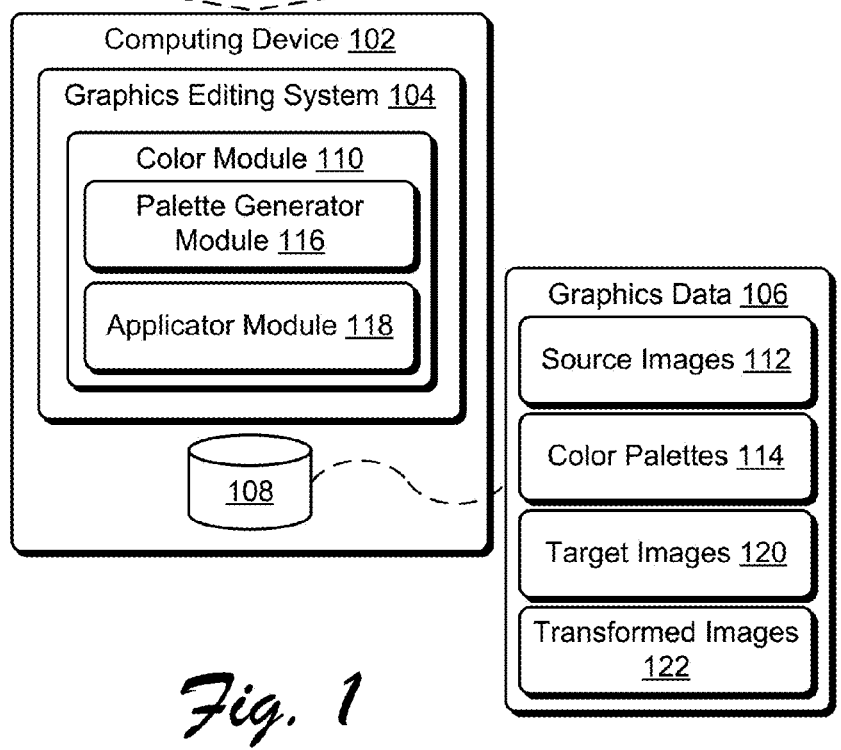
Fig. 1

1000 ⟶

1002
Receive input of a region selector to a region of a source image

↓

1004
Identify selected visual objects by correlating the region selector to a selected region of the source image that includes the visual objects

1102
Receive input of a region selector as a selection of a visual object

↓

1104
Determine that the visual object is grouped with other visual objects

↓

1106
Identify the other visual objects included as part of the group

*Fig. 11*

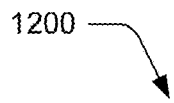
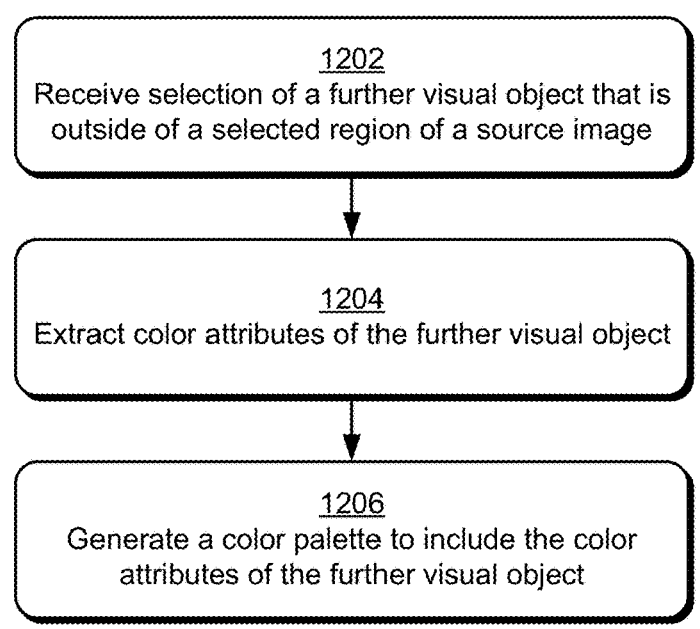
Fig. 12

SELECTIVE EXTRACTION OF COLOR ATTRIBUTES FROM DIGITAL IMAGES

BACKGROUND

One of the most powerful tools in a digital designer's arsenal is color and based on color's profound effect on a viewer's perception of visual elements, color plays a significant role in design. In approaching a particular digital design project, a designer typically selects a color palette that consists of a collection of a discrete set of colors (e.g., 3-6 different colors) which define the visual theme of a design. To select a color palette for a digital design project, designers often draw inspiration from various sources, such as natural settings and existing artwork created by other designers. In particular, designers often seek to replicate color themes from existing artwork in digital form. Conventional techniques for extracting color themes from existing digital artwork, however, exhibit a number of drawbacks. For instance, "eyedropper" techniques enable designers to manually pick colors from a digital artwork. Such eyedropper techniques, however, only typically enable colors to be selected one at a time, and thus are labor intensive and prone to mistakes due to the course selective ability of an eyedropper tool. Other conventional techniques enable color palette extraction, but such techniques are coarse in nature and do not enable a designer to designate specific areas of a digital artwork from which to extract a color theme.

SUMMARY

Techniques are described for selective extraction of color attributes from digital images that overcome the challenges experienced in conventional systems for color extraction. In an implementation, a user applies a region selector to a source image to select a portion of the source image for color attribute extraction. A graphics editing system identifies a selected region of the source image as well as visual objects of the source image included as part of the selected region. The graphics editing system iterates through the selected visual objects and extracts color attributes from the visual objects, such as color values, patterns, gradients, gradient stops, opacity, color area, and so forth. The graphics editing system then generates a color palette that includes the extracted color attributes, and the color palette is able to be utilized for various image editing tasks, such as digital image creation and transformation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIG. 1 is an illustration of an environment in an example implementation that is operable to employ selective extraction of color attributes from digital images techniques described herein.

FIG. 10 depicts a procedure in an example implementation for identifying selected visual objects via region selection.

FIG. 11 depicts a procedure in an example implementation for identifying selected visual objects via object selection.

FIG. 12 depicts a procedure in an example implementation for appending a visual object to a set of selected visual objects.

DETAILED DESCRIPTION

Overview

Figure 2A:
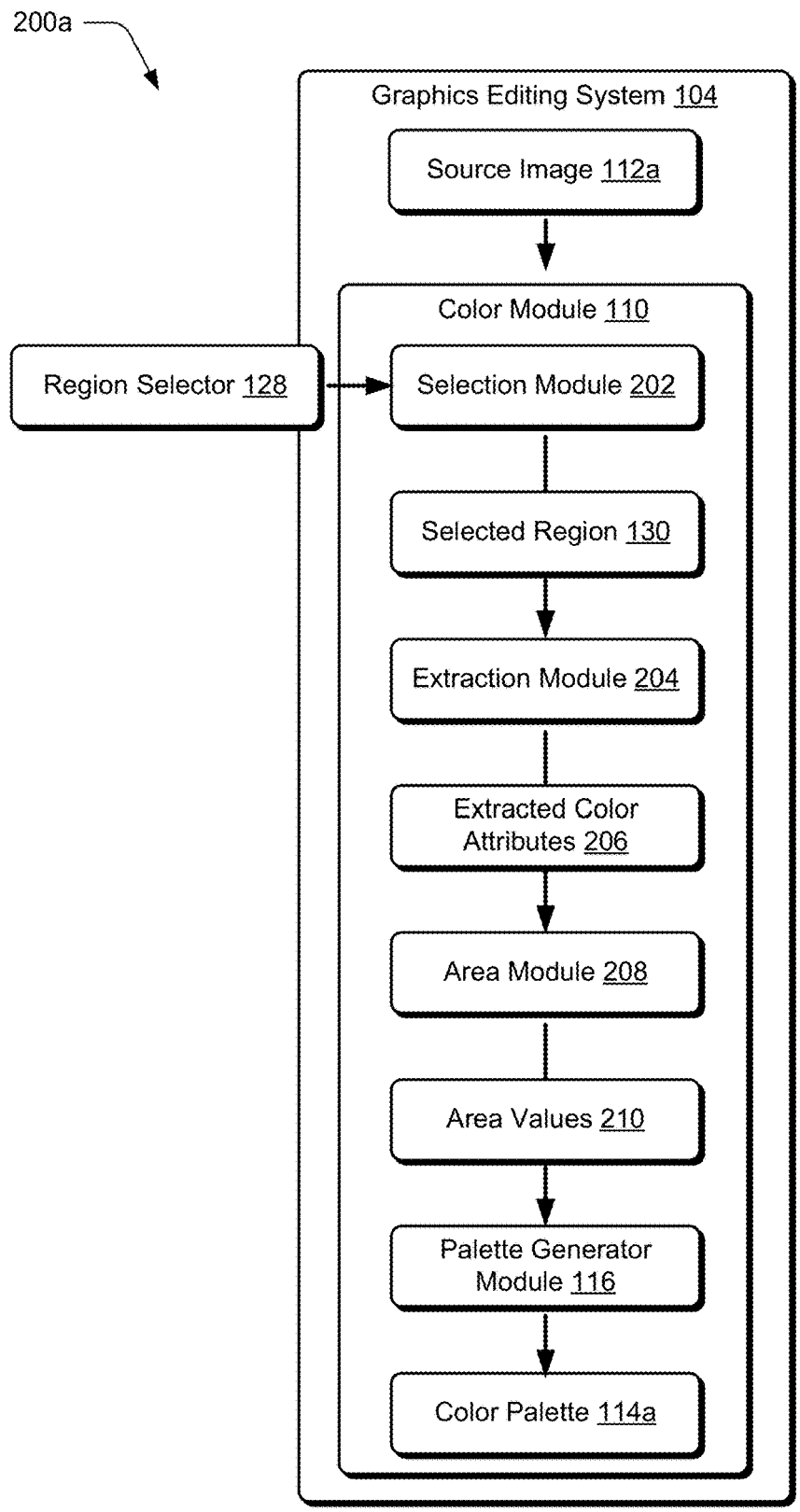
FIG. 2a depicts an example system for generating a color palette from a source image.

Digital color palettes provide digital designers with selections of colors for design tasks, such as part of generating and/or editing digital images. In generating a color palette, designers often wish to utilize color attributes from existing digital images, such as digital images generated by other designers. Conventional techniques for extracting color attributes from existing images, however, exhibit a number of drawbacks. For instance, some conventional techniques only enable single color selection from a portion of an image. Thus, a designer is faced with the task of manually selecting colors of interest one-by-one from an image of interest. Other conventional techniques attempt to extract color attributes from an entire image, and thus provide large sets of color attributes that a designer must then sort through to identify colors of interest. Accordingly, conventional techniques are labor intensive and prone to inaccuracies in color selection, and thus result in inefficient use of system resources.

Accordingly, techniques are described for selective extraction of color attributes from digital images that overcome the challenges experienced in conventional systems for color extraction. In an implementation, a user leverages a graphics editing system to select a source image from which the user wishes to obtain a set of colors for use as part of a design task, such as for editing a different digital image. The user then applies a region selector to the source image to select a portion of the source image for color attribute extraction. Generally, the region selector is applicable in different ways, such as by drawing a shape around a portion of the source image (e.g., a freeform drawing), selecting a visual object group included in the source image, and so forth.

In response to receiving the user input of the region selector, the graphics editing system identifies a region of the source image selected as well as visual objects of the source image included as part of the selected region. For instance, in an implementation where the region selector is applied as a selection shape, the graphics editing system identifies selected visual objects as visual objects that are encompassed and/or intersected by the shape. In an implementation where the region selector is applied as a selection of visual object included in a visual object group, the graphics editing system identifies selected visual objects as other visual objects included in the group. Accordingly, the graphics editing system iterates through the selected visual objects and extracts color attributes from the visual objects, such as color values, patterns, gradients, gradient stops, opacity, color area, and so forth. To determine color area, for instance, the graphics editing system determines a proportion of the selected region of the source image that is populated by individual colors and/or other color attributes.

The graphics editing system then generates a color palette that includes the extracted color attributes. The color palette, for instance, identifies colors extracted from the selected visual objects, and optionally includes other color attributes such as patterns, gradients, color area, and so forth. The color palette is able to receive user interaction to apply color attributes from the color palette as part of image editing tasks, such as for applying the color attributes to other images. For instance, the color attributes are applicable to a target image to generate a transformed image. The target image, for example, includes an original color scheme based on a particular set of colors. Thus, color attributes from the generated color palette are applicable by the graphics editing system to replace the original set of colors of the target image with color attributes from the color palette.

In at least one implementation, color transformation of a target image is performed by determining color area values for both the target image and a color palette to be applied, and correlating the color area values. For instance, color attributes from the color palette with the highest area values are used to replace color attributes from the target image with the highest area values. Generally, this enables a resulting transformed image to accurately reflect a color scheme represented by the color palette.

Accordingly, the techniques described herein overcome challenges to color extraction presented in conventional systems. For instance, by enabling specific regions of source images to be selected, specific sets of visual objects are selectable for color extraction. Generally, this represents in increase in efficiency over conventional systems since a user need not select individual colors one-by-one or sort through a very large set of extracted colors to identify color attributes of interest.

Among other improvements, this reduces the burden on system resources (e.g., processors, memory, network bandwidth, and so forth) that are allocated to color extraction tasks.

Term Definitions

These term definitions are provided for purposes of example only and are not intended to be construed as limiting on the scope of the claims.

As used herein, the term "image" refers to digital visual content that is displayable and editable via a graphics editing system. For instance, "images" include "source images" from which color attributes are extracted, and "target images" to which extracted color attributes are applicable to generate "transformed images." Generally, a variety of different digital image types are usable according to the described techniques, such as vector images, raster images, and so forth.

As used herein, the term "visual object" refers to an object and/or set of objects that combine to form a digital image. A visual object, for example, is implemented as a visual primitive that combines with other visual primitives to form visual attributes of a digital image. Examples of a visual object include a vector, a bitmap primitive, a Bezier shape (e.g., a Bezier curve), a set of visual primitives, and so forth.

As used herein, the term "region selector" refers to an input that is applied to a digital image to select visual objects from the digital image for color extraction. A region selector, for example, is applied via user input that defines a subregion of a digital image. Generally, a region selector is applicable in various ways, such as via user input using a mouse and cursor, touch input to a touch input device, and so forth.

As used herein, the term "color attribute" refers to visual features of a digital image, such as color values, patterns, gradients, gradient stops, opacity values, color area, and so forth. Further, color values refer to values in a suitable color space that define different colors, such as in terms of red green blue (RGB) values, cyan magenta yellow black (CMYK) values, Pantone values, and so forth.

As used herein, the term "color area" refers to a relative amount (e.g., surface area) that a particular color attribute occupies within a selected region of a digital image. Color area is specifiable in different ways, such as in terms of pixel numbers, pixel percentage, percentage of surface area of a digital image, and so forth.

As used herein, the term "color palette" refers to a set of color attributes that are extracted from a selected region of a digital image. A color palette, for example, specifies different colors that are extracted from a selected region and optionally includes other attributes that pertain to the selected colors, such as patterns, gradients, gradient stops, opacity values, color area, and so forth.

In the following discussion, an example environment is described that employs the techniques described herein. Example systems, implementation scenarios, and procedures are also described which are performable in the example environment as well as other environments. Generally, performance of the example procedures is not limited to the example environment and the example environment is not limited to performance of the example procedures.

Example Environment

FIG. 1 is an illustration of a digital medium environment 100 in an example implementation that is operable to employ selective extraction of color attributes from digital images techniques described herein. The illustrated environment 100 includes a computing device 102 which is configurable in a variety of ways. The computing device 102, for instance, is configurable as a desktop computer, a laptop computer, a mobile device (e.g., assuming a handheld configuration such as a tablet or mobile phone as illustrated), and so forth. Additionally, although a single computing device 102 is shown, the computing device 102 is implementable via a plurality of different devices, such as multiple servers utilized by an entity to perform operations "over the cloud" as described in FIG. 14.

The computing device 102 is illustrated as including a graphics editing system 104, which is representative of functionality for performing aspects of selective extraction of color attributes from digital images described herein. The computing device 102 also includes graphics data 106 stored on a storage 108 and which is utilized and/or generated by the graphics editing system 104. The graphics editing system 104 includes a color module 110 that is implemented at least partially in hardware of the computing device 102 to process source images 112 and extract color palettes 114 from the source images 112. Although illustrated as implemented locally at the computing device 102, functionality of the graphics editing system 104 is also implementable in whole or part via functionality available via a network, such as part of a web service and/or in a cloud-based implementation.

To enable various functionality described herein, the color module 110 includes a palette generator module 116 and an applicator module 118. The palette generator module 116 is representative of functionality to extract the color palettes 114 from the source images 112, such as by identifying selected regions of the source images 112 and extracting different colors from the selected regions. The applicator module 118 represents functionality for applying the color palettes 114 to transform different images, such as images from target images 120 to generate transformed images 122.

The computing device 102 further includes a display device 124 on which a graphics graphical user interface (GUI) 126 is displayed. Generally, the graphics GUI 126 is generated by the graphics editing system 104 and enables various graphics presentation and editing operations to be performed and displayed. In this particular example, a source image 112a is presented on the graphics GUI 126. Further, a color palette 114a is displayed that is extracted from the source image 112a. A user, for instance, interacts with the graphics processing system to input a region selector 128 for selecting a selected region 130 of the source image 112a. In this particular example, the region selector 128 is input via freeform input, such as by a freehand drawing a closed curve around the selected region 130. However, a region selector 128 is able to be input via a variety of other techniques, such as selecting a visual object, region selection with a pre-configured selection shape, and so forth. Accordingly, the palette generator module 116 processes the selected region 130 to extract the color palette 114a. Generally, the color palette 114a represents a set of different colors and other color attributes identified from within the selected region 130. As further detailed below, the extracted color palette 114a is able to be utilized for various purposes, such as for transforming a target image 120 to generate a transformed image 122.

In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Systems and Implementation Scenarios

The following discussion describes example systems and implementation scenarios for selective extraction of color attributes from digital images. Aspects of each of the systems and scenarios are implementable in hardware, firmware, software, or a combination thereof.

Figure 2B:
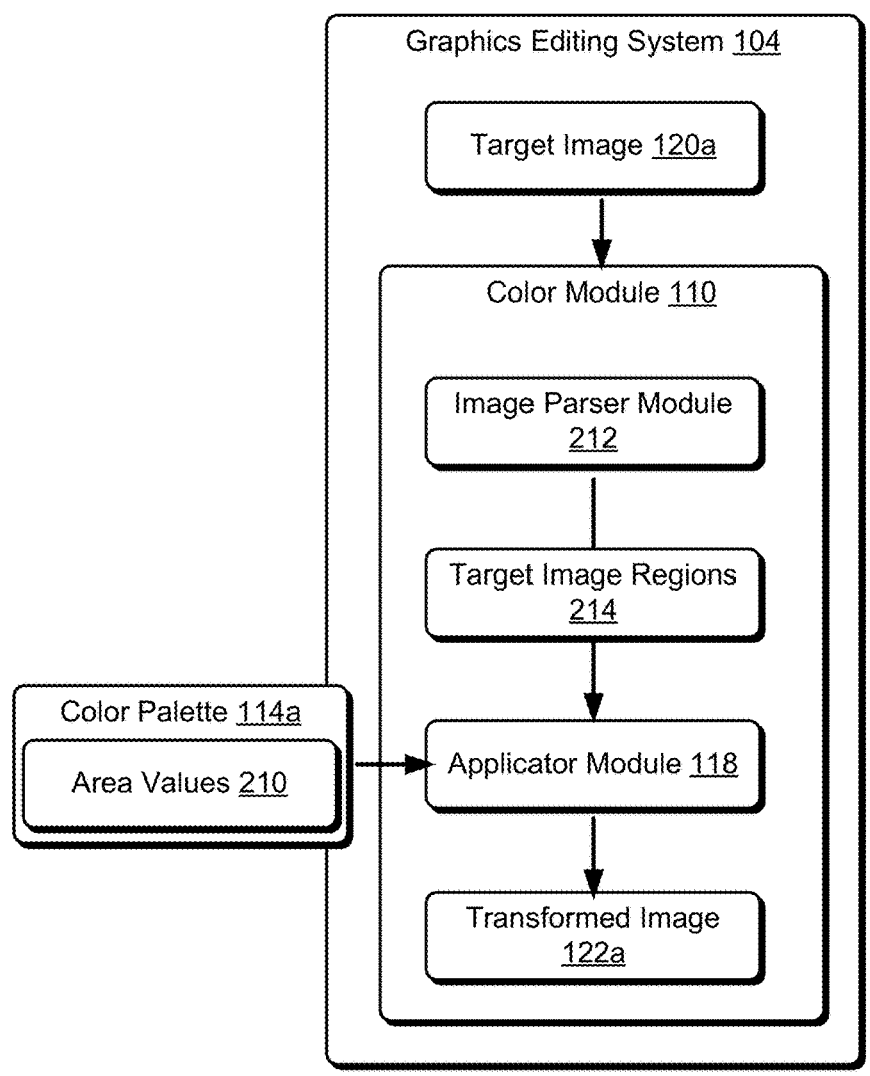
FIG. 2b depicts an overview of example system for utilizing a color palette for image transformation.
Figure 2C:
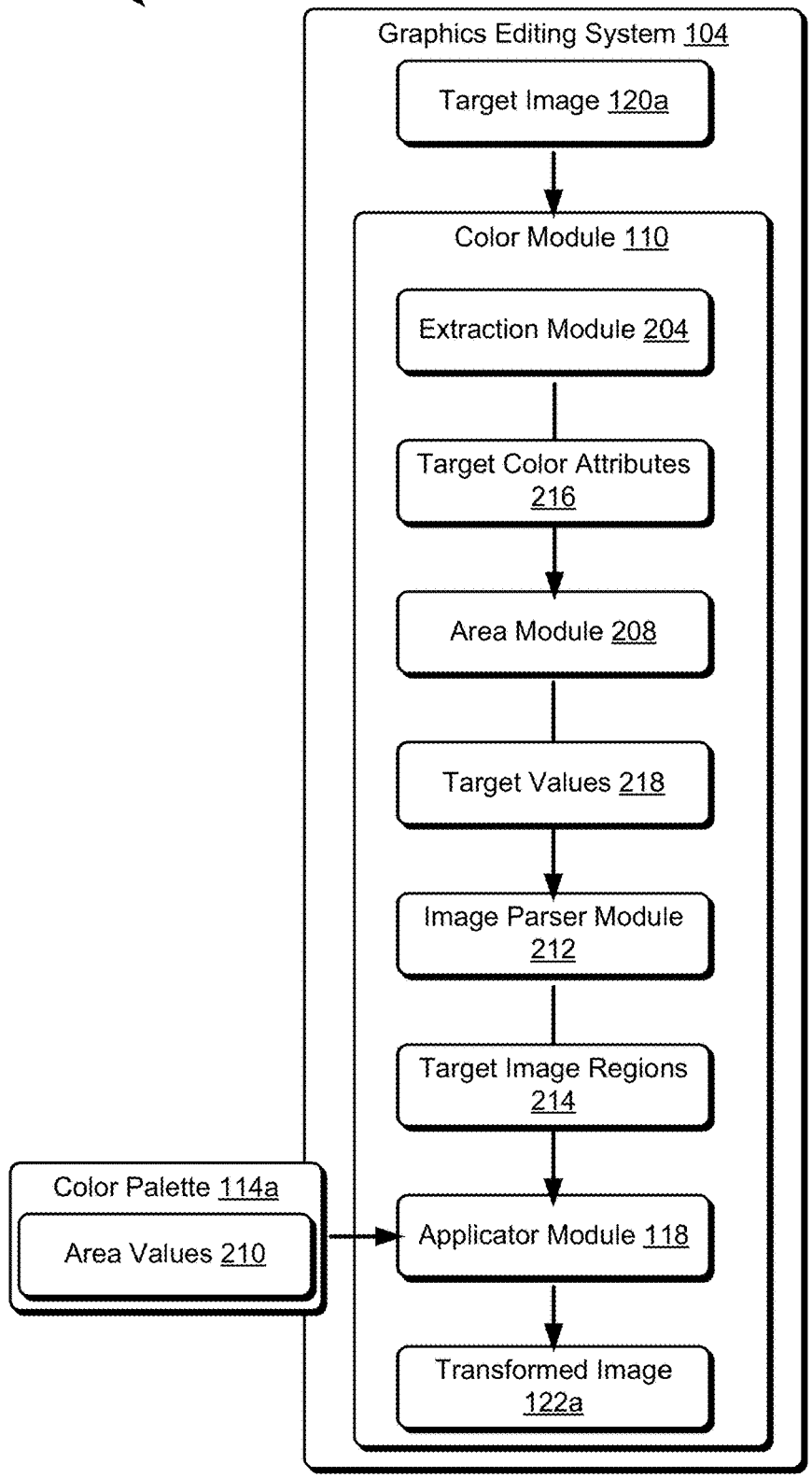
FIG. 2c depicts an example system for identifying image regions of a source image as part of image transformation.

FIGS. 2a, 2b, 2c depict aspects of an example system for performing selective extraction of color attributes from digital images and image transformation. FIG. 2a, for instance, depicts a system 200a for generating a color palette from a source image. In the system 200a, the color module 110 receives the source image 112a, such as based on a user selection of the source image 112a from the source images 112. Further, a user inputs the region selector 128 to the source image 112a which is detected and processed by a selection module 202 to identify the selected region 130 of the source image 112a. The selection module 202, for instance, represents functionality to detect selection of portions of a source image 112 and to identify which portions are to be utilized for generating a color palette. For example, the selection module 202 determines which portions of the source image 112a are to be included as part of the selected region, such as based on a position of the region selector 128 relative to the source image 112a. Example operational aspects of the selection module 202 are detailed below.

An extraction module 204 processes the selected region 130 to extract a set of extracted color attributes 206. The extraction module 204, for instance, represents functionality for iterating through different sections of the selected region 130 and identifying colors and other visual attributes that are present at each region, such as on a pixel-by-pixel basis within the selected region 130 to generate the extracted color attributes 206. Generally, the extracted color attributes 206 are identified according to color values for any suitable color system(s), such as red green blue (RGB), cyan magenta yellow black (CMYK), Pantone, and so forth. The extracted color attributes 206 include other types of color attributes, such as shading, patterns, color stops, and so forth.

An area module 208 processes the extracted color attributes 206 to determine a relative area of each color attribute within the selected region 130. The area module 208, for instance, represents functionality for determining (e.g., measuring) how much area within the selected region 130 each color of the extracted color attributes 206 occupies to generate area values 210. The area values 210, for example, specify how much of each color of the extracted color attributes 206 is present in the selected region 130, such as in terms of numbers of pixels, aggregate area (e.g., as a percentage of a total surface area of the selected region 130), and so forth.

Using the extracted color attributes 206 and (optionally) the area values 210, the palette generator module 116 generates the color palette 114a. The color palette 114a, for instance, identifies (e.g., visually) the extracted color attributes 206 and optionally, the area values 210. In at least one implementation, the palette generator module 116 generates the color palette 114a subject to certain extraction constraints, such as by limiting the color palette 114a to a certain number of different extracted color attributes 206 (e.g., n different colors) that have the highest area values 210 within the selected region 130. A user, for instance, specifies that n different colors are to be extracted from the source image 112. Accordingly, if more than n colors are extracted, only n different colors with the highest area values 210 are used to generate the color palette 114a and other extracted colors are omitted.

FIG. 2b depicts a system 200b for utilizing a color palette for image transformation. The system 200b, for example, represents an extension of the system 200a. In the system 200b, a target image 120a is input to the color module 110 (e.g., based on a user selection) and an image parser module 212 parses the target image 120a into target image regions 214. The target image regions 214, for instance, represent different visual regions of the target image 120a, such as different visual objects (e.g., primitives) that make up the target image 120a. In at least one implementation, the target image regions 214 are based on different colors that make up the target image 120a, such as described below with reference to the system 200c.

Utilizing the target image regions 214 and the color palette 114a as input, the applicator module 118 applies the color palette 114a to the target image 120a to generate a transformed image 122a. The applicator module 118, for example, replaces original colors of the target image regions 214 with colors from the color palette 114a. In at least one implementation, the applicator module 118 applies the color palette 114a to the target image 120a based on the area values 210. For instance, colors with the highest area values 210 are applied to the largest target image regions 214 as part of generating the transformed image 122a.

FIG. 2c depicts a system 200c for identifying image regions of a source image as part of image transformation. The system 200c, for example, represents a detailed way for identifying the target image regions 214 as part of generating the transformed image 122a, such as in reference to the system 200b. In the system 200c, the extraction module 204 processes the target image 120a to extract target color attributes 216. The target color attributes 216, for instance, include a collection of colors that make up the target image 120a, such as all or part of the target image 120a.

The area module 208 then determines target area values ("target values") 218 for the target color attributes 216. The target values 218, for example, specify "how much" of each target color attribute 216 is present within the target image 120a, such as based on pixel coverage, total color area, and so forth. The image parser module 212 then defines the target image regions 214 based at least in part on the target color attributes 216 and the target values 218. For instance, each target color attribute 216 represents a different respective target image region 214. Thus, as part of generating the transformed image 122a, a particular target color attribute 216 is replaced with a particular color from the color palette 114a. In at least one implementation, the target values 218 are correlated to the area values 210 of the color palette 114a as part of applying the color palette 114a to the target image regions 214. For instance, a color from the color palette 114a with a highest area value 210 is used to populate a target image region 214 with a highest target value 218, a color from the color palette 114a with a second highest area value 210 is used to populate a target image region 214 with a second target value 218, and so forth until a transformation constraint is satisfied. The transformation constraint, for example, is based on a number of target image regions 214 that are transformed using the color palette 114a, such as a set of s target image regions 214 with the highest target values 218.

The following section describes some example implementation scenarios for selective extraction of color attributes from digital images in accordance with one or more implementation. Generally, the various scenarios are implementable according to the systems described above and the procedures described below.

Figure 3:
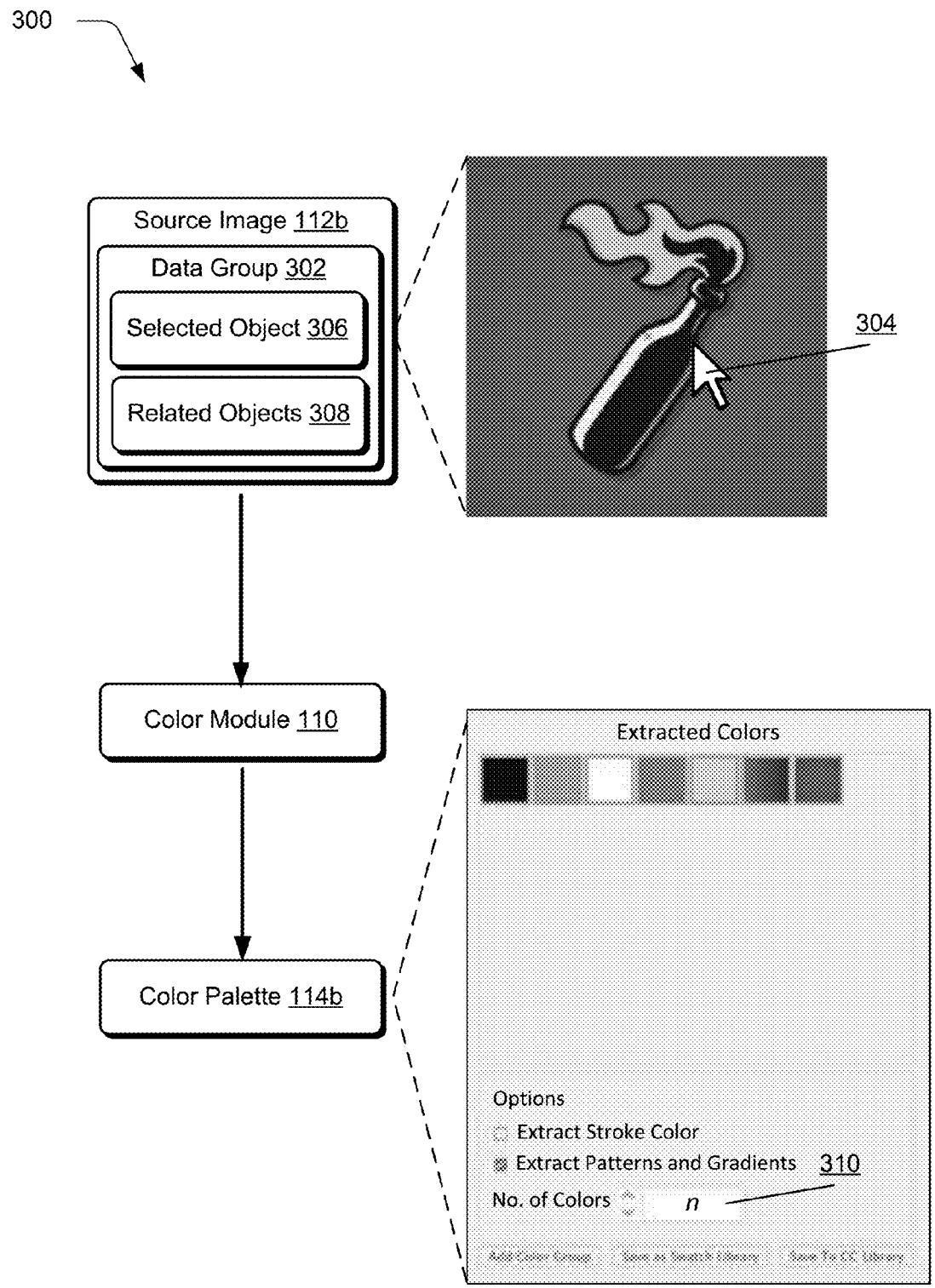
FIG. 3 depicts an example implementation scenario for generating a color palette from a source image that includes an object group.

FIG. 3 depicts an example implementation scenario 300 for generating a color palette from a source image that includes an object group. The scenario 300 includes a source image 112b which in this example represents an image (e.g., a vector image) that consists of a group of visual objects that combine to form the visual appearance of the source image 112b. The source image 112b, for instance, is made up of a group of vector-based primitives. Accordingly, the source image 112b includes a data group 302 that defines the grouping of vectors that make up the source image 112b. In at least one implementation, the data group 302 is implemented as a tree structure with individual nodes that each represent a different vector and/or set vectors of the source image 112b.

Continuing, a user selection 304 is applied to the source image 112b and the source image 112b is processed by the color module 110 to extract a color palette 114b. The user selection 304, for example, is applied to a single portion of the source image 112b, such as a single point selection within a boundary of the source image 112b. The user selection 304 is applicable is various ways, such as a cursor placement and mouse click, a user touch gesture (e.g., a single finger tap) on the source image 112b, and so forth. Accordingly, in response to the user selection 304, the color module 110 identifies a selected object 306 that represents a visual object selected by the user selection 304. The location of the selected object 306, for instance, positionally coincides with the user selection 304 on a display surface of the display device 124. The color module 110 then identifies related objects 308 that are within the data group 302. The related objects 308, for instance, represent other visual objects that are related to the selected object 306 in the data group 302. In at least one implementation, the selected object 306 and the related objects 308 represent different respective nodes on a data tree representation of the data group 302. Accordingly, the color module 110 extracts color data from the data group 302 to generate the color palette 114b. In at least one implementation, the source image 112b includes other visual objects that are not a part of the data group 302, and thus colors for these particular visual objects are not extracted and utilized to generate the color palette 114b. In this particular example, the color palette 114b includes an extraction constraint field 310 that enables a user to specify a maximum number n of colors to utilize to generate the color palette 114b. For instance, if the color module 110 extracts more than n colors from the source image 112b, the colors with the highest area values 210 are utilized to generate the color palette 114b up to n different colors, with remaining colors omitted from the color palette 114b.

Figure 4:
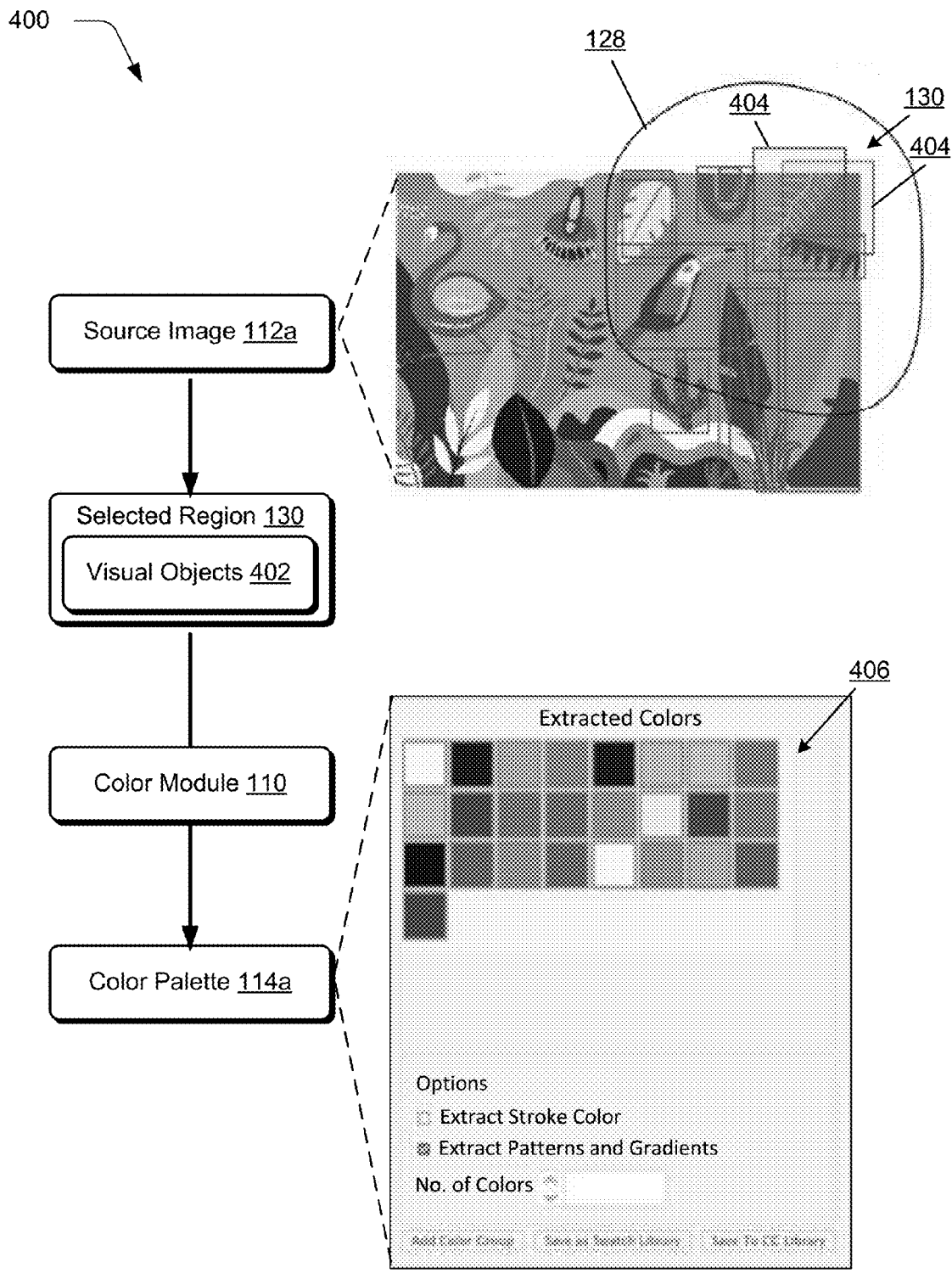
FIG. 4 depicts an example implementation scenario for generating a color palette from a selection portion of a source image.

FIG. 4 depicts an example implementation scenario 400 for generating a color palette from a selection portion of a source image. The scenario 400 includes the source image 112a with the region selector 128 applied to identify the selected region 130. Accordingly, in response to detecting the region selector 128 applied to the source image 112a, the color module 110 extracts the color palette 114a from visual objects 402 identified as being within and/or overlapping with the selected region 130. The visual objects 402, for instance, are individually depicted here at least partially within a selection indicia 404. The selection indicia 404 are depicted to identify individual visual objects 402 that are included in the selected region 130, and in at least one implementation are not visually displayed as part of a user experience with the graphics editing system 104.

Accordingly, the color module 110 presents the color palette 114a, which includes colors 406 extracted from the selected region 130. In at least one implementation, the colors 406 are arranged in the color palette 114a based on their respective area values 210. For instance, colors 406 are presented in the color palette 114a hierarchically according to their area values 210, with colors 406 with the highest area values 210 presented first and then in a descending order accordingly to colors with decreasing area values. Additionally or alternatively, other techniques are utilized to identify colors 406 with higher area values 210, such as by configuring a display size of each color 406 in the color palette 114a based on a respective area value 210. Accordingly, the color palette 114a is able to receive user interaction, such as to select individual colors and/or sets of colors for use in digital image editing.

Figure 5:
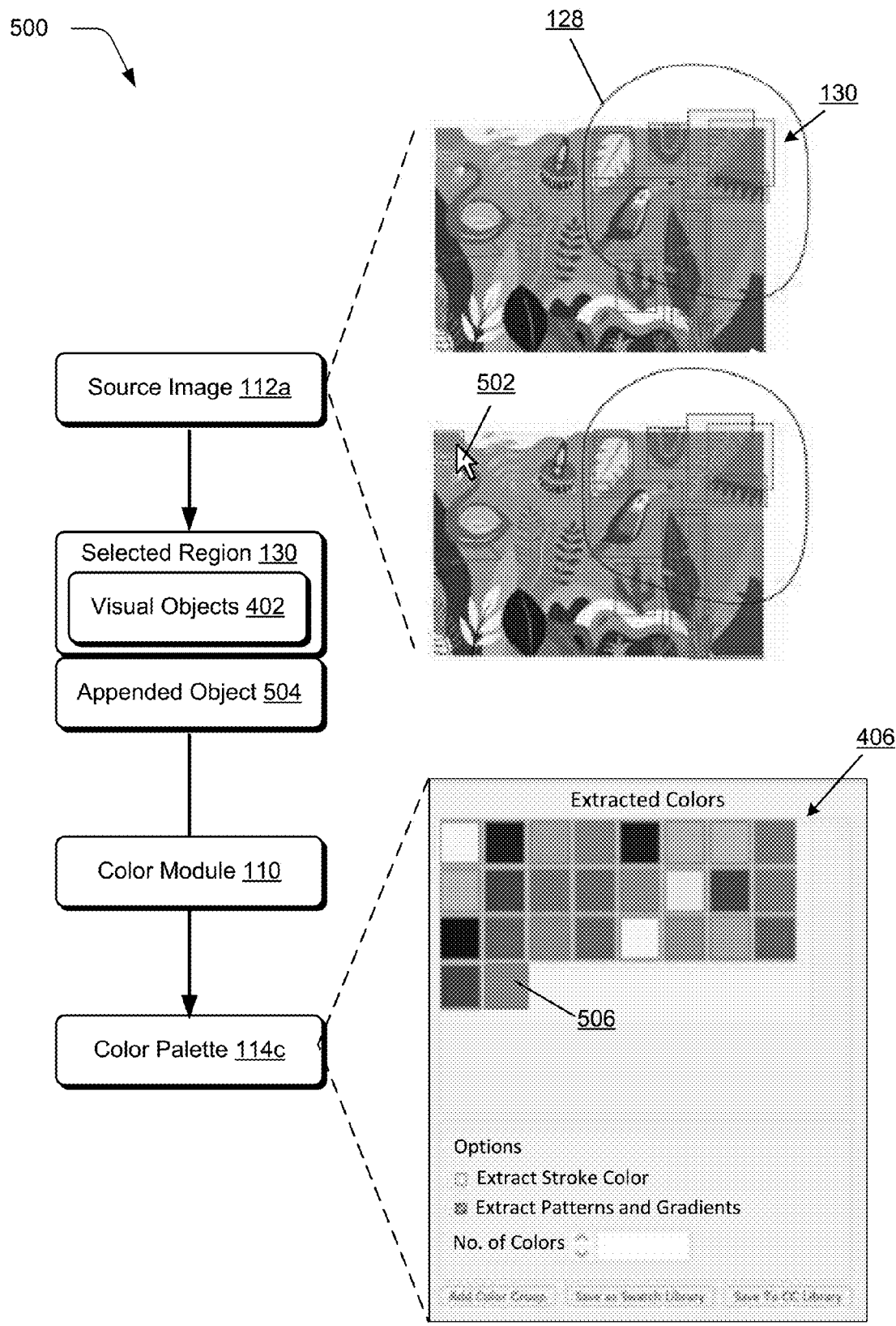
FIG. 5 depicts an example implementation scenario for appending a visual object outside of a selected region of a source image for generating a color palette.

FIG. 5 depicts an example scenario 500 for appending a visual object outside of a selected region of a source image for generating a color palette. The scenario 500, for instance, represents a variation on the scenario 400. The scenario 500 includes the source image 112a with the region selector 128 applied to identify the selected region 130. Further, a user applies an append selection 502 to append an appended visual object 504 to the visual objects 402 for use in generating a color palette 114c. The color palette 114c, for instance, represents a modified version of the color palette 114a that is modified to add a color 506 (and/or set of colors) that is extracted from the appended object 504. Generally, the append selection 502 is applicable in different ways. For instance, after applying the region selector 128, a user selects and holds a particular key of a keyboard (e.g., a shift key) which enables an append select mode of the color module 110 such that further visual objects are selectable while the selected region 130 remains selected. Alternatively or in addition, a particular touch gesture is mapped to the append select mode such that applying the touch gesture causes the append selection 502 to be applied to the appended object 504. Generally, the append select mode is activatable and applicable in a variety of different ways.

Accordingly, the color module 110 extracts colors from the selected region 130 and the appended object 504 to generate the color palette 114c. In this particular example, the color palette 114c includes the color 506 that is extracted from the appended object 504 in addition to the colors 406 that are extracted from the selected region 130.

Figure 6:
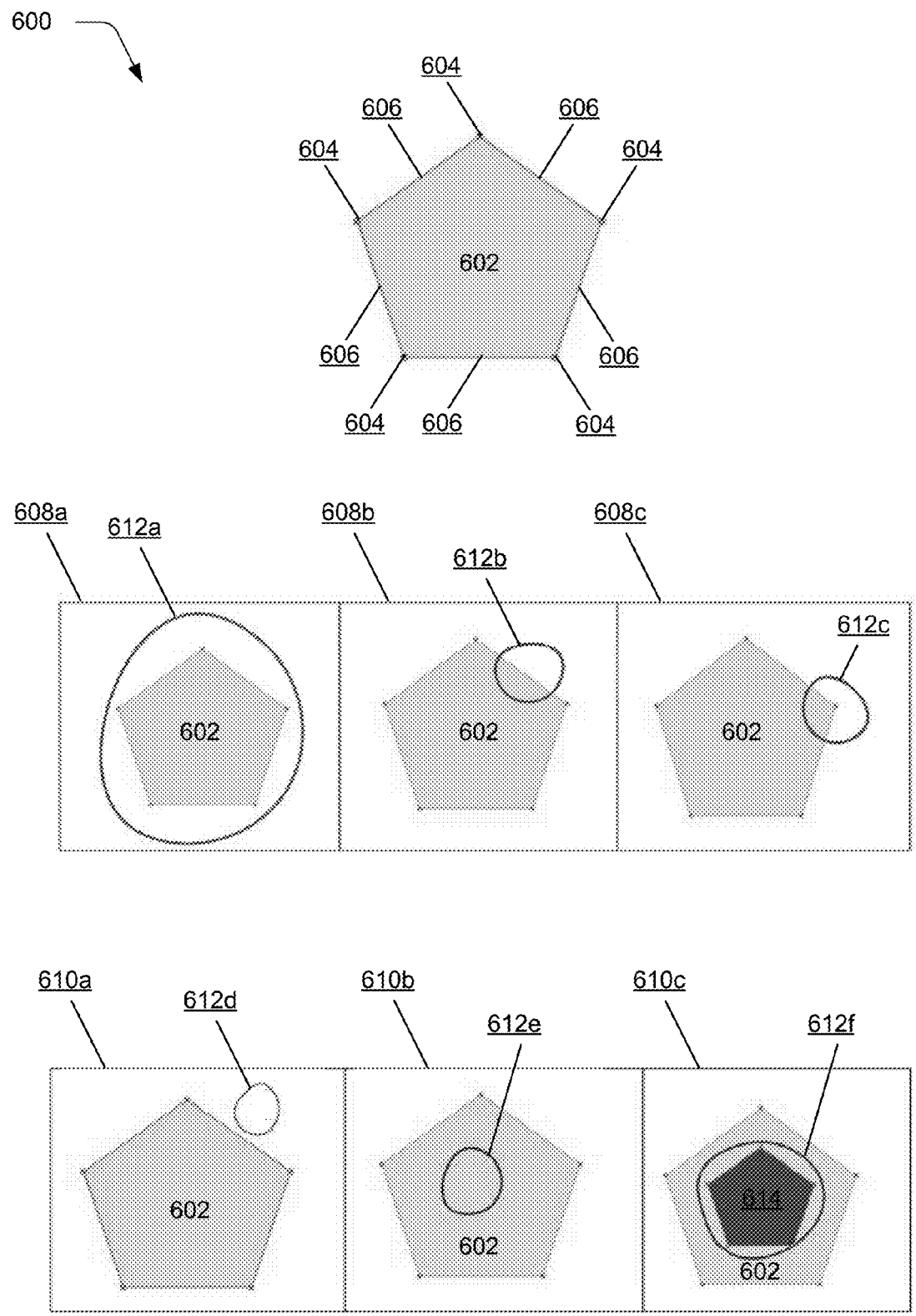
FIG. 6 depicts an example implementation scenario that describes example ways for identifying visual objects to be included and not included as part of a selected region of a digital image for color extraction.

FIG. 6 depicts an implementation scenario 600 that describes example ways for identifying visual objects to be included and not included as part of a selected region of a digital image for color extraction. The scenario 600 includes a visual object 602 with geometric attributes including anchor points 604 and paths 606 that connect the anchor points. In at least one implementation, the visual object 602 is made up of different Bézier shapes including the paths 606.

The scenario 600 includes different selection examples 608 where the visual object 602 is to be included as part of a selection region for purposes of color extraction, and selection examples 610 where the visual object 602 is not to be included as part of a selection region for purposes of color extraction. Generally, whether a selection relative to the visual object 602 is included as part of the selection examples 608 or the selection examples 610 is based on a position of a region selector 612 relative to the visual object 602. For instance, 2 conditions are utilized and satisfying at least one of the two conditions results in the visual object 602 being included as part of a selection region: (1) An anchor point 604 lies within the region selector 612; and/or (2) a path 606 intersects the region selector 612.

Accordingly, a selection example 608a depicts an implementation where a region selector 612a is applied around the visual object 602, which satisfies condition (1). A selection example 608b depicts an implementation where the visual object 602 is positioned partially within a region selector 612b and a path 606 intersects the region selector 612b, which satisfies condition (2). Further, a selection example 608c depicts an implementation where the visual object 602 is positioned partially within a region selector 612c, paths 606 intersect the region selector 612c, and an anchor point 604 is within the region selector 612c. The selection example 608c satisfies both conditions (1) and (2).

The selection examples 610 do not satisfy either of the conditions (1) or (2), including a selection example 610a where a region selector 612d is completely outside of the visual object 602 and selection examples 610b, 610c where region selectors 612e, 612f, respectively, are completely inside the visual object 602. In the selection example 610c a visual object 614 is positioned within the visual object 602 as well as within the region selector 612f. Thus, in the selection example 610c the visual object 614 is considered part of a selection region (based on condition (1) above), whereas the visual object 602 is not. Generally, this enables a visual object that is visually nested within a larger visual object to be selected independently of the larger visual object.

Figure 7:
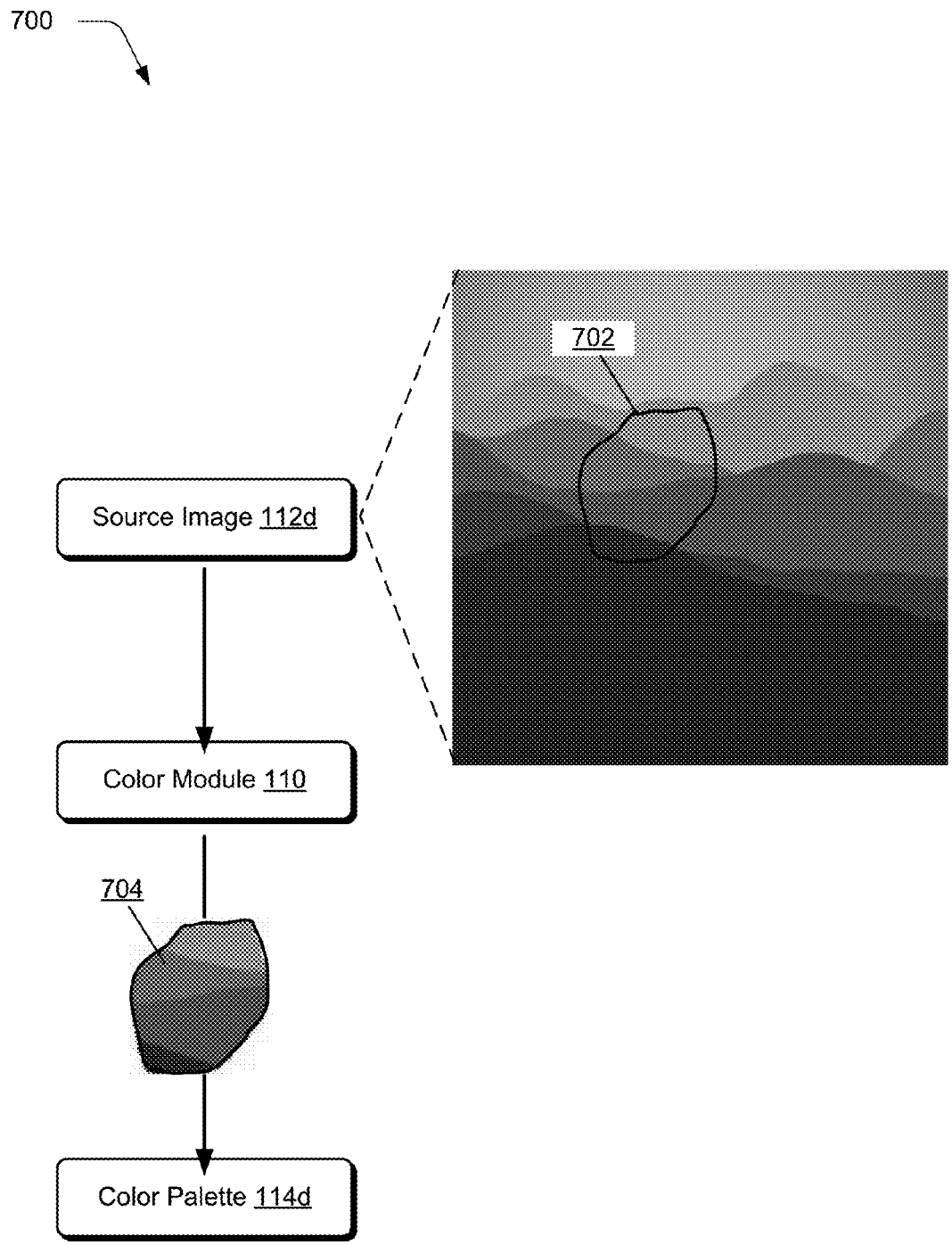
FIG. 7 depicts an example implementation scenario for image cropping for color extraction.

FIG. 7 depicts an example implementation scenario 700 that describes example ways for image cropping for color extraction. The scenario 700 includes a source image 112d with a region selector 702 applied within the source image 112d. In this particular example, a selected region 704 is generated by cropping an area within the region selector 702 from the source image 112d. For instance, instead of applying the criteria described above in the scenario 600, the selected region 704 is cropped out of the source image 112d and the color module 110 extracts colors from within the selected region 704 to generate a color palette 114e. In at least one implementation, the source image 112d is a raster image and thus techniques described herein enable color palettes to be generated from raster images as well as vector images.

Figure 8:
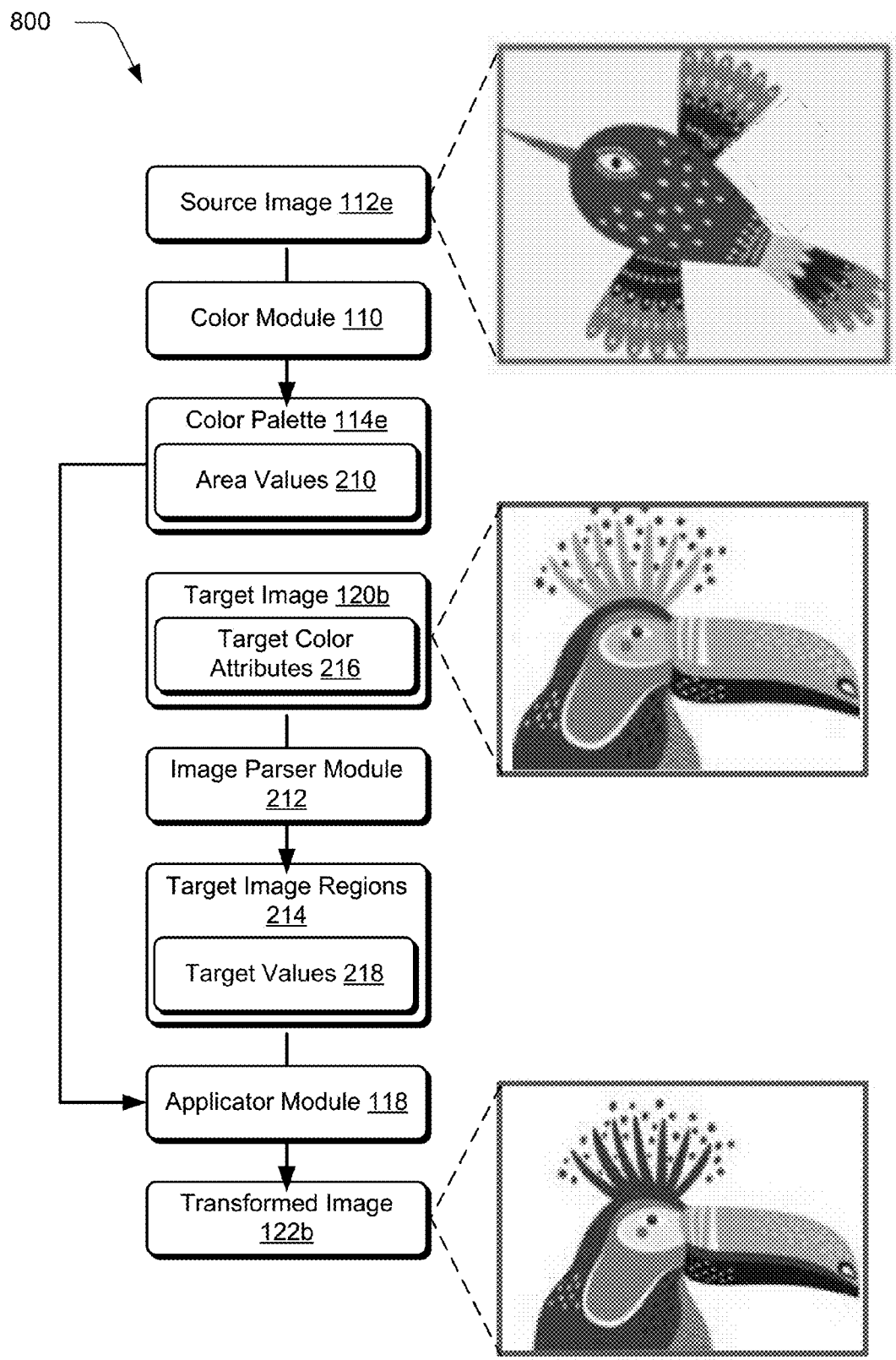
FIG. 8 depicts an example implementation scenario for image transformation utilizing a color palette.

FIG. 8 depicts a scenario 800 that describes an example way for image transformation utilizing a color palette. The scenario 800, for instance, depicts an illustration of implementation of the systems 200b, 200c described above. In the scenario 800, the color module 110 processes a source image 112e to generate a color palette 114e using colors extracted from the source image 112e. Further, the color module 110 receives a target image 120b be transformed using the color palette 114e. Accordingly, the applicator module 118 applies the color palette 114e to the source image 112g to generate a transformed image 122b. For instance, target color attributes 216 of the target image 120b are replaced with color attributes from the color palette 114e.

In at least one implementation, the transformed image 122b is generated by applying color palette 114e to the source image 112g by correlating area values 210 of the color palette 114e to target values 218 of the target image 120b. For instance, and as detailed above with reference to the system 200c, colors from the color palette 114e with the highest area values 210 are used to replace colors from the target image 120b with the highest target values 218. Thus, the transformed image 122b reflects a color scheme identified by the color palette 114e, e.g., colors from the color palette 114e with the highest area values 210 are used to transform a color scheme of the target image 120b to generate the transformed image 122b.

Example Procedures

The following discussion describes procedures that are implementable utilizing the previously described systems and devices. Aspects of the procedures are able to be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-8.

Figure 9:
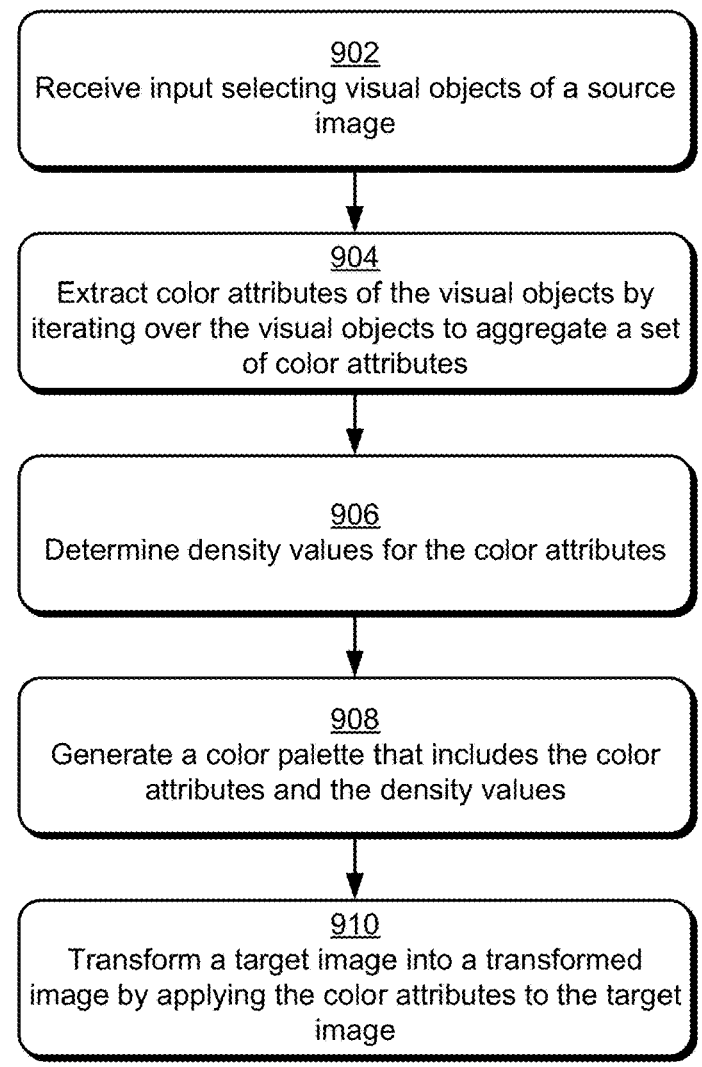
FIG. 9 depicts a procedure in an example implementation of selective extraction of color attributes from digital images using a graphics editing system.

FIG. 9 depicts a procedure 900 in an example implementation of selective extraction of color attributes from digital images. Step 902 receives input selecting visual objects of a source image. The selection module 202, for instance, receives user input to select visual objects of a source image 112 for use in generating a color palette. Generally, the selection is applicable in a variety of different ways, such as based on a selected region of the source image, a selection of a visual object included as part of an object group, and so forth.

Step 904 extracts color attributes of the visual objects by iterating over the visual objects to aggregate a set of color attributes from the visual objects. The extraction module 204, for example, extracts color attributes such as color values, color gradients, color stops, color patterns, and so forth, from the visual objects. Generally, color values are extracted using any suitable color space, such as RGB, CMYK, and so forth.

Step 906 determines area values for the color attributes. The area values, for instance, indicate a relative amount of each color attribute that is present in the visual objects. Step 908 generates a color palette that includes the color attributes and the area values. The palette generator module 116, for instance, generates a color palette 114 to include the color attributes and area values for at least some of the color attributes. The color palette 114, for instance, identifies colors extracted from the visual objects and area values for the colors. In at least one implementation, generating the color palette includes populating a graphical user interface with visual indications of the color attributes and optionally, the area values.

Step 910 transforms a target image into a transformed image by applying the color attributes to the target image. The applicator module 118, for instance, utilizes color attributes from the color palette 114 to replace original color attributes of a target image 120 and generate a transformed image 122. In at least one implementation, this transformation occurs in response to receiving selection of color attributes via a graphical user interface that presents the color palette.

FIG. 10 depicts a procedure 1000 for identifying selected visual objects. The procedure 1000, for instance, is performed in conjunction with the procedure 900, such as part of step 902. Step 1002 receives input of a region selector to a region of a source image. The selection module 202, for example, detects user input to apply a region selector 128 to a portion of a source image 112. The region selector 128 is applicable in various ways, such as via freeform and/or freehand user input to the display device 124, via utilization of a preconfigured selection frame (e.g., a rectangular selection frame), selection of a single visual object included as a group of visual objects, and so forth.

Step 1004 identifies selected visual objects of the source image by correlating the region selector to a selected region of the source image that includes the visual objects. The selection module 202, for example, identifies a selected region 130 and visual objects included in the selected region. Generally, different selection criteria are usable to determine which visual objects are included in the selected region 130. For instance, in at least one example the region selector 128 is applied using a line that defines a shape on the source image. Accordingly, in this example, visual objects that are encompassed by the shape and/or that are intersected by the line are considered to be selected visual objects. Thus, the selected visual objects are further processed to extract color attributes and generate a color palette 114, such as described throughout.

FIG. 11 depicts a procedure 1100 for identifying selected visual objects. The procedure 1100, for instance, is performed in conjunction with the procedure 900, such as part of step 902. Further, the procedure 1100 is performable as an alternative or addition to the procedure 1000 to enable visual object selection.

Step 1102 receives input of a region selector as a selection of a visual object. The selection module 202, for instance, detects user input to select a visual object of a source image. In at least one implementation, the selection is applied to a single visual object. Step 1104 determines that the visual object is grouped with other visual objects. For example, the selection module 202 determines that the selected visual object is part of a grouped set of visual objects, such as a group of related vectors.

Step 1106 identifies the other visual objects included as part of the group. The selection module 202, for instance, iterates over the object group to identify visual objects included as part of the group. In at least one implementation, the object group is arranged hierarchically. Thus, in such implementations the selection module 202 identifies a top level visual object from the object group and then identifies other visual objects that descend from the top level visual object. The object group, for example, is implemented as a tree structure with visual objects representing individual nodes of the tree structure. Thus, the selection module 202 traverses the tree structure to a top level node and identifies the visual objects as other nodes that descend in the tree structure from the top level node. In at least one implementation, where the group of visual objects is included as part of a source image, the source image 112 includes other visual objects that are not a part of the group and thus are not identified as part of the selected visual object. The selected visual objects identified as part of the group are further processed to extract color attributes and generate a color palette 114, such as described throughout.

FIG. 12 depicts a procedure 1200 for appending a visual object to a set of selected visual objects. The procedure 1200, for instance, is performed in conjunction with the procedure 900. Step 1202 receives a selection of a further visual object that is outside of a selected region of a source image. For instance, after a set of visual objects is selected (e.g., as described in FIGS. 10 and/or 11), a user selects a further visual object. The further visual object, for example, is outside of a selection region and/or selected object of the source image. In at least one implementation, an appended selection mode is activated in conjunction with (e.g., prior to) selection of the further visual object. For instance, a user first selects an initial set of visual objects and then activates the appended selection mode to enable selection of the further visual object. The appended selection mode is activatable in different ways, such as using a particular key of a keyboard, a particular touch gesture, voice activation using a keyword, and so forth.

Step 1204 extracts color attributes of the further visual object. The extraction module 204, for instance, extracts various color attributes from the further visual object. In at least one implementation, the extraction module 204 extracts color attributes from an initial set of selected visual objects along with the color attributes of the further visual object. Step 1206 generates a color palette to include the color attributes of the further visual object. For example, the palette generator module 116 generates a color palette that includes color attributes of the further visual object. In at least one implementation, this includes using the color attributes to generate a new color palette or modifying an existing color palette.

Figure 13:
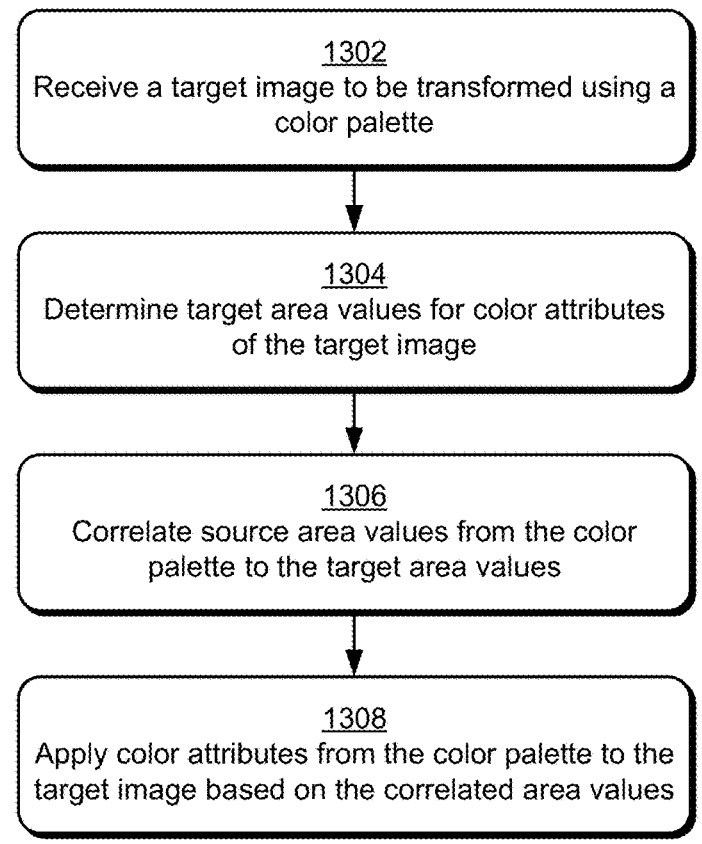
FIG. 13 depicts a procedure in an example implementation for modifying a digital image using a color palette.

FIG. 13 depicts a procedure 1300 for modifying a digital image using a color palette. The procedure 1300, for instance, is performed in conjunction with the procedure 900, such as part of executing step 910. Step 1302 receives a target image to be transformed using a color palette. The applicator module 118, for instance, receives user selection of a target image 120, such as via input to the graphics GUI 126. Step 1304 determines target area values for color attributes of the target image. For instance, the area module 208 iterates over the target image 120 to determine area values for colors of the target image 120. In at least one implementation, the image parser module 212 utilizes the target area values to identify different target image regions 214. For instance, a set of colors of the target image 120 with the highest target area values are specified as the target image regions 214. Further, each target image region 214 has its own target area value.

Step 1306 correlates source area values from the color palette to the target area values. The applicator module 118, for example, correlates color attributes from the color palette with the highest source area values to color attributes of the target image with the highest target area values. In at least one implementation, the correlation is performed in descending order of area values between the source area values and the target area values.

Step 1308 applies color attributes from the color palette to the target image based on the correlated area values. For instance, the applicator module 118 replaces color attributes of the target image with color attributes from the source image and based on their respective area values. As one example, a color attribute of the target image with a highest target area value is replaced with a color attribute of the color palette with a highest source area value, and so on in descending order of respective area values. Generally, this causes the target image to be transformed to reflect a color theme identified by the color palette.

Accordingly, techniques for selective extraction of color attributes from digital images enable color attributes to be selectively extracted from a source image to generate a color palette and the color palette to be applied to transform a target image, which is not possible using convention techniques.

Example System and Device

Figure 14:
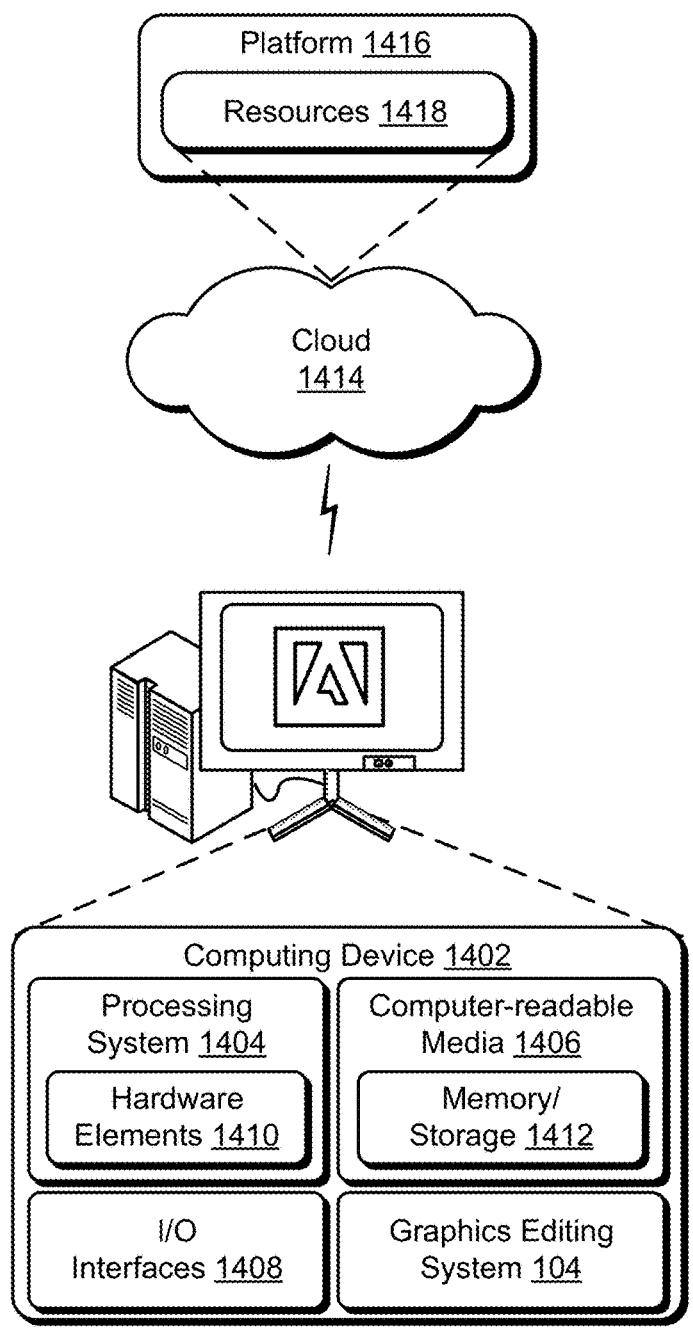
FIG. 14 illustrates an example system including various components of an example device that is implementable as any type of computing device as described and/or utilized with reference to FIGS. 1-13 to perform implementations of techniques described herein.

FIG. 14 illustrates an example system generally at 1400 that includes an example computing device 1402 that is representative of one or more computing systems and/or devices that implement the various techniques described herein. This is demonstrated via inclusion of the graphics editing system 104. The computing device 1402, for example, represents a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interfaces 1408 that are communicatively coupled, one to another. Although not shown, the computing device 1402 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that are be configured as processors, functional blocks, and so forth. This includes example implementations in hardware as an application specific integrated circuit or other logic device formed using one or more semiconductors. The hardware elements 1410 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1406 is illustrated as including memory/storage 1412. The memory/storage 1412 represents memory/storage capacity associated with one or more computer-readable media. In one example, the memory/storage component 1412 includes volatile media (such as random access memory (RAM)) and/or nonvolatile media (such as read only memory (ROM), Flash memory, optical disks, magnetic disks, and so forth). In another example, the memory/storage component 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1410. For example, the computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supportable by various configurations of the computing device 1402 and are not limited to the specific examples of the techniques described herein. This functionality is also implementable entirely or partially through use of a distributed system, such as over a "cloud" 1414 as described below.

The cloud 1414 includes and/or is representative of a platform 1416 for resources 1418. The platform 1416 abstracts underlying functionality of hardware (e.g., servers) and software resources of the cloud 1414. For example, the resources 1418 include applications and/or data that are utilized while computer processing is executed on servers that are remote from the computing device 1402. In some examples, the resources 1418 also include services provided over the Internet and/or through a subscriber network, such as a cellular or Wi-Fi network.

The platform 1416 abstracts the resources 1418 and functions to connect the computing device 1402 with other computing devices. In some examples, the platform 1416 also serves to abstract scaling of resources to provide a corresponding level of scale to encountered demand for the resources that are implemented via the platform. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium image editing environment, a method implemented by at least one computing device, the method comprising:
    identifying, by a selection module implemented by the at least one computing device, selected visual objects of a source image by correlating a region selector applied to the source image to a selected region of the source image that includes the visual objects;
    extracting, by an extraction module implemented by the at least one computing device, color attributes of the visual objects by iterating over the visual objects to aggregate a set of color attributes from the visual objects;

generating, by a palette generator module implemented by the at least one computing device, a color palette including populating a graphical user interface with visual indications of the color attributes; and transforming, by an applicator module implemented by the at least one computing device, a target image into a transformed image by applying one or more of the color attributes to the target image in response to receiving selection of the one or more color attributes via the graphical user interface.

2. The method as described in claim 1, wherein said identifying the selected visual objects of the source image comprises:

receiving input of the region selector as a line defining a shape on the source image; and determining that the selected visual objects represent visual objects of the source image that are one or more of encompassed by the shape or intersected by the line.

3. The method as described in claim 2, wherein said receiving input comprises receiving input of the line via freeform input applied to the source image.

4. The method as described in claim 1, wherein the source image comprises a vector-based image, and wherein the selected visual objects comprise a set of vectors that are one or more of encompassed by the region selector or intersected by the region selector.

5. The method as described in claim 1, wherein said identifying the selected visual objects of the source image comprises:

receiving input of the region selector as a selection of a single visual object of the visual objects; and identifying others of the visual objects as part of the selected visual objects by determining that the single visual object and the others of the visual objects are grouped together as part of an object group included in the source image.

6. The method as described in claim 5, wherein source image includes one or more visual objects that are not included in the object group and thus are not identified as part of the selected visual objects.

7. The method as described in claim 1, wherein said extracting color attributes comprises extracting one or more of color values, color gradients, color stops, or color patterns from the visual objects.

8. The method as described in claim 1, further comprising determining, by an area module implemented by the at least one computing device, area values for each of the color attributes indicating a relative amount of each color attribute that is present in the visual objects; and generating the color palette to indicate the area values.

9. The method as described in claim 8, wherein the graphical user interface includes visual indicia of different individual colors as part of the color attributes, and the visual indicia are configured to indicate the area values of the respective individual colors.

10. The method as described in claim 1, wherein said transforming the target image into the transformed image comprises replacing original color attributes of the target image with one or more of the color attributes from the color palette.

11. The method as described in claim 10, wherein the color attributes of the color palette include first area values indicating a relative amount of each color attribute that is present in the visual objects, the target image includes second area values indicating a relative amount of different color attributes present in the target image, and wherein said replacing original color attributes of the target image with one or more of the color attributes of the color palette is based on correlating the first area values to the second area values.

12. The method as described in claim 1, further comprising:

receiving, by the selection module implemented by the at least one computing device, a selection of a further visual object that is outside of the selected region;

extracting, by the extraction module implemented by the at least one computing device, one or more color attributes of the further visual object; and generating, by the palette generator module implemented by the at least one computing device, the color palette to include the one or more color attributes of the further visual object.

13. In a digital medium image editing environment, a system comprising:

a selection module implemented at least partially in hardware of at least one computing device to receive a selection of a visual object and identify other visual objects that are related to the selected visual object as part of a group of visual objects;

an extraction module implemented at least partially in hardware of the at least one computing device to extract color attributes of the grouped visual objects by iterating over the visual objects to aggregate a set of color attributes from the visual objects;

a palette generator module implemented at least partially in hardware of the at least one computing device to generate a color palette including populating a graphical user interface with visual indications of the color attributes; and an applicator module implemented at least partially in hardware of the at least one computing device to transform a target image into a transformed image by applying one or more of the color attributes to the target image in response to receiving selection of the one or more color attributes via the graphical user interface.

14. The system as described in claim 13, wherein the selection of the visual object comprises a selection of a point on a source image that includes the visual object and wherein the other visual objects are positioned in the source image outside of the selected point.

15. The system as described in claim 13, wherein the selected visual object comprises a selected vector and wherein the other visual objects comprise other vectors that are related to the selected vector as part of the group of visual objects.

16. The system as described in claim 13, wherein:

the selection module is further implemented to receive a selection of a further visual object that is not a part of the group of visual objects;

the extraction module is further implemented to extract one or more color attributes of the further visual object; and the palette generator module is further implemented to generate the color palette to include the one or more color attributes of the further visual object.

17. The system as described in claim 13, further comprising:

an area module implemented at least partially in hardware of at least one computing device to determine area values for each of the color attributes, the area values indicating a relative amount of each color attribute that is present in the visual objects of the group, wherein the palette generator module is further implemented to generate the color palette to include the area values.

18. A system for transforming a digital image, the system comprising:

means implemented by at least one computing device for identifying selected visual objects of a source image by correlating a region selector applied to the source image to a selected region of the source image that includes the visual objects;

means implemented by at least one computing device for extracting color attributes of the visual objects by iterating over the visual objects to aggregate a set of color attributes from the visual objects;

means implemented by at least one computing device for generating a color palette including populating a graphical user interface with visual indications of the color attributes; and means implemented by at least one computing device for transforming a target image into a transformed image by applying one or more of the color attributes to the target image in response to receiving selection of the one or more color attributes via the graphical user interface.

19. The system as described in claim 18, further comprising means implemented by at least one computing device for determining area values for each of the color attributes, the area values indicating a relative amount of each color attribute that is present in the visual objects of the group, wherein the color palette is generated to include the area values.

20. The system as described in claim 18, wherein the region selector comprises a line defining a shape on the source image, and said identifying the selected visual objects comprises identifying visual objects of the source image that are one or more of encompassed by the shape or intersected by the line.

* * * * *